B. F. STURTEVANT.

Blank for Shoe-Pegs.

No. 6,300. Reissued Feb. 16, 1875.

Witnesses.

L. H. Latimer.

Wm Pratt.

Inventor.

Benjamin F. Sturtevant

PER Crosby Gregory

ATTYS.

THE GRAPHIC CO. PHOTO-LITH. 39 & 41 PARK PLACE, N.Y.

UNITED STATES PATENT OFFICE.

BENJAMIN F. STURTEVANT, OF BOSTON, MASSACHUSETTS.

IMPROVEMENT IN BLANKS FOR SHOE-PEGS.

Specification forming part of Letters Patent No. 25,149, dated August 16, 1859; reissue No.2,286, dated June 12, 1866; extended seven years; reissue No. 6,300, dated February 16, 1875; application filed February 8, 1875.

*To all whom it may concern:*

Be it known that I, BENJAMIN F. STURTEVANT, of Boston, in the county of Suffolk and State of Massachusetts, have invented an Improved Peg-Blank, which is especially adapted for use in boot and shoe pegging machines, and of which the following is a full, clear, and exact description, reference being had to the accompanying drawings, wherein—

Figure 1:
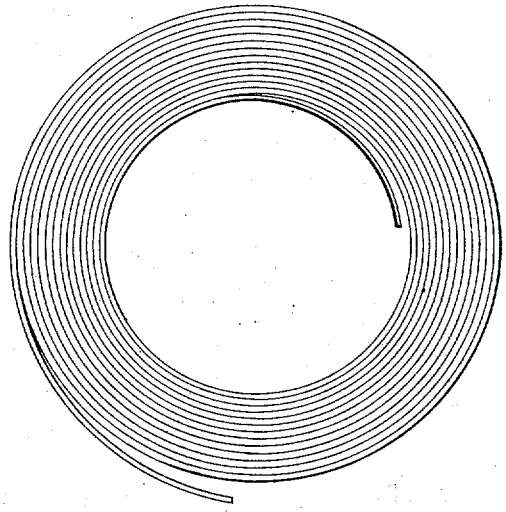
Figure 2:
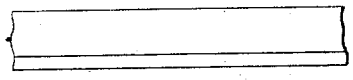

Figure 1 is a plan of the coil or ribbon of wood constituting my improved peg-blank. Fig. 2 is a side elevation, and Fig. 3 a transverse section, showing one edge of the same sharpened, so that pegs cut therefrom shall be already pointed.

Prior to my invention herein set forth, peg-blanks were made either by splitting off strips of the required thickness from a block of wood which had parallel faces lying at right angles to the grain, and embracing between them the length of peg desired, or by sawing off like strips from such a block, which, for the purpose of increasing its dimensions, was sometimes formed of several separate pieces of wood united by glue. But these strips were always made by rectilinear cuts across the block from side to side, and through it from one parallel face to the other, so that it was not possible to obtain a sound peg-blank longer than the diameter of the log from which the block was obtained; nor was it found practical to make the composite strip of any considerable length, both on account of the weakness of the glue-joints by which its separate pieces were united, and of its incapability of being put up compactly for safe and convenient handling. Moreover, these peg-blanks, when split from the block, had rough and uneven surfaces, by reason of irregularities in the cleavage of the wood, and when sawed out they were not left so smooth and uniform as is desirable, although obtained with greater waste of material and cost of manufacture, while in either case they were of such limited length as to be unfitted for practical and profitable use in pegging-machines, because of the impossibility of insuring the formation of perfect pegs at the abutting ends of successive strips as they are fed to the knife which severs the pegs therefrom.

The peg-blank which constitutes the subject-matter of my present invention consists of a ribbon or coil of sound and continuous wood of suitable width and thickness, produced from a log or cylindrical block by a prolonged spiral cut following the general direction of the annular layers due to the growth of the wood.

This new peg-blank has smooth and uniform surfaces, is so compact in form that it may be easily handled without danger of breaking, and is of such great length as to insure continuity in the series of perfect pegs obtained therefrom to a practically indefinite extent; whereby the pegging-machine is rendered capable of uninterrupted operation upon a large number of boots or shoes successively without danger of defective work incident to the use of the old split or sawed peg-blanks. Its employment has also enabled the pegging-machine to be materially improved and simplified in construction by dispensing with the special contrivances needed for receiving the old split and sawed peg-blanks side by side in stacks, and for supplying them successively to the mechanism by which they were fed forward to the peg-severing knife.

The machinery which I had in use for making the above-described ribbon peg-blank at the date of my original application for Letters Patent, No. 25,149, granted to me August 16, 1859, is fully set forth in the Letters Patent, No. 26,627, granted to me December 27, 1859, to which reference may be had.

Figure 3:
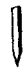

The mode of operation of this machinery, when applied to the manufacture of my ribbon peg-blank, is as follows:

The log from which the peg-blanks are to be cut is firmly secured between the centers of the lathe, and turned to a cylindrical shape. The severing-knife, the presser-bar, and the dividing-cutters, all attached to the slide-rest, and properly adjusted with relation to each other, are then brought into the desired position, and, as the lathe is set in motion, are fed forward with a regular rate of movement, equal in distance to the thickness of the peg-blank desired, at each entire rotation of the lathe spindle, whereby the log is cut into long spiral ribbons or coils of the required width and thickness, without impairing the soundness or continuity of the wood of which they consist. Each ribbon, as it is cut from the log, may be wound on a spool, ready for use; and in order that the pegs severed therefrom may be already pointed, to facilitate their driving, I sharpen one edge thereof with a double chamfer or bevel, as indicated in Figs. 2 and 3 of the drawings.

I claim as a new manufacture—

1. A peg-blank consisting of a ribbon of wood made and constituted substantially as described.

2. The described ribbon peg-blank, having one of its edges sharpened, substantially as and for the purpose set forth.

BENJ. F. STURTEVANT.

Witnesses:

G. W. GREGORY,

S. B. KIDDER.